United States Patent
Alary

(10) Patent No.: US 6,649,552 B1
(45) Date of Patent: Nov. 18, 2003

(54) CERAMIC FIBERS FOR THE REINFORCEMENT OF REFRACTORY MATERIALS

(75) Inventor: Jean-Andre Alary, Le Fayet (FR)

(73) Assignee: Pem Abrasifs Refractaires, Courbevoie (FR)

( * ) Notice: Subject to any disclaimer, the term of this patent is extended or adjusted under 35 U.S.C. 154(b) by 69 days.

(21) Appl. No.: 09/660,834

(22) Filed: Sep. 13, 2000

(30) Foreign Application Priority Data

Sep. 20, 1999 (FR) .............................. 99 11908

(51) Int. Cl.$^7$ .............................................. C04B 35/00
(52) U.S. Cl. ...................................... 501/95.2; 501/128
(58) Field of Search .............................. 501/95.2, 95.1, 501/94, 35, 153, 128

(56) References Cited

U.S. PATENT DOCUMENTS

| | | | | |
|---|---|---|---|---|
| 2,674,539 A | * | 4/1954 | Harter et al. | 264/DIG. 19 |
| 3,183,071 A | * | 5/1965 | Rue et al. | 51/298 |
| 3,239,970 A | * | 3/1966 | Bishop | 451/32 |
| 3,387,957 A | * | 6/1968 | Howard | 51/298 |
| 3,481,723 A | * | 12/1969 | Kistler et al. | 51/298 |
| 3,754,948 A | * | 8/1973 | Ash | 138/149 |
| 3,793,204 A | * | 2/1974 | Ardary et al. | 252/62 |
| 3,939,002 A | * | 2/1976 | Washbourne | 264/321 |
| 4,094,690 A | | 6/1978 | Morton | |
| 4,314,827 A | * | 2/1982 | Leitheiser et al. | 51/298 |
| 4,331,773 A | * | 5/1982 | Hongo et al. | 501/128 |
| 4,804,645 A | * | 2/1989 | Ekstrom | 501/104 |
| 4,849,382 A | | 7/1989 | Shibata et al. | |
| 4,900,603 A | * | 2/1990 | Boily et al. | 266/280 |
| 4,943,543 A | * | 7/1990 | Ingelstrom | 501/127 |
| 5,045,506 A | * | 9/1991 | Dube et al. | 501/128 |
| 5,053,362 A | * | 10/1991 | Chi et al. | 106/194.1 |
| 5,129,919 A | * | 7/1992 | Kalinowski et al. | 51/309 |
| 5,185,012 A | * | 2/1993 | Kelly | 51/295 |
| 5,376,598 A | * | 12/1994 | Preedy et al. | 156/89.22 |
| 5,605,870 A | * | 2/1997 | Strom-Olsen et al. | 501/35 |
| 5,679,041 A | * | 10/1997 | Sokol et al. | 428/357 |
| 5,972,102 A | * | 10/1999 | Vezza | 106/692 |
| 6,043,172 A | * | 3/2000 | Hart | 501/95.1 |
| 6,043,173 A | * | 3/2000 | Hart | 501/95.2 |
| 6,067,821 A | * | 5/2000 | Jackson et al. | 65/19 |
| 6,183,852 B1 | * | 2/2001 | Rorabaugh et al. | 264/621 |

FOREIGN PATENT DOCUMENTS

| | | |
|---|---|---|
| EP | 0395087 | 10/1990 |
| JP | 61091071 | 5/1986 |
| JP | 02051474 | 2/1990 |
| JP | 05320623 | 12/1993 |
| JP | 05320623 A | * 12/1993 |

* cited by examiner

*Primary Examiner*—Tom Dunn
*Assistant Examiner*—Colleen P. Cooke
(74) *Attorney, Agent, or Firm*—Dennison, Schultz & Dougherty

(57) ABSTRACT

The subject of the invention is ceramic fibers for the reinforcement of refractory materials, being constituted by sintered bauxite fibers with a length/diameter greater than 10. Preferably, they have a cylindrical or prismatic shape truncated by two surfaces, for example, substantially planar surfaces perpendicular to the axis of the prism.

They enable the mechanical strength and the lifetime of the refractory products to be significantly increased.

11 Claims, No Drawings

CERAMIC FIBERS FOR THE REINFORCEMENT OF REFRACTORY MATERIALS

TECHNICAL FIELD OF THE INVENTION

The invention relates to the field of refractory materials mechanically reinforced by the addition of fibers.

STATE OF THE TECHNOLOGY

Traditional refractories made up of metal oxides and/or carbon have very limited mechanical properties. For certain applications, it has been shown that the lifetime of a refractory lining depends more on its mechanical properties than on its intrinsic refractory qualities. For example, it is the case for the lining of pouring ladles, and particularly the top part of the ladle referred to as the spout which is the seat of continuous clogging up under the effect of the progressive solidification of the products being cast. Because of this, it is subjected to scouring operations at regular intervals. This scouring is accompanied inevitably by the removal of the refractory lining when the deposits to be removed stick, to a greater or lesser degree, to the refractory. This is practically always the case.

It is known that, on a pouring spout made of graphite, the deposits stick rather less but exposure of the graphite to the air limits its lifetime due to oxidation. Furthermore it is a material which is a relatively good thermal conductor, which favors deposition and clogging.

According to the current state of the technology, the best results with respect to lifetime are obtained by using castable refractories filled with metal fibers.

SUMMARY OF THE INVENTION

The aim of the invention is to provide refractory materials reinforced by fibers and made stronger by the use of fibers which are more suitable than the metal fibers of the prior art.

The subject of the invention is fibers for the reinforcement of refractory materials constituted by sintered bauxite having a length/diameter ratio which is greater than 10. These fibers have a cylindrical or prismatic form truncated by two surfaces, for example, surfaces that are substantially planar and perpendicular to the axis of the cylinder or prism. The prismatic shapes may have a section comprising concave areas, for example in the form of a star. For fibers of circular section, the diameter is that of the circle of the section. For other section shapes, the diameter is that of the circle having the same surface area as the section (an equivalent diameter).

Another subject of the invention is a castable refractory based on metal oxides reinforced by the incorporation of from 0.1 to 50% by weight of fibers of sintered bauxite such as those described below.

DETAILED DESCRIPTION OF THE INVENTION

An experimental study has enabled a comparison to be made of the properties of refractory pieces made of castable refractory, used either as it is, or reinforced with metal fibers, or reinforced with the fibers which are the subject of this invention.

The results of this study confirm that the addition of fibers to a castable refractory improves its mechanical properties. However, this study shows that while the metal fibers remain the best means of increasing resistance to abrasion, the fibers of sintered bauxite which are the subject of the invention perform much better in improving the compressive strength and the bending strength. In addition, this improvement is obtained with a percentage addition of fiber which can be significantly less than that used in the case of metal fibers.

The formulations selected in relation to the measured mechanical properties have been tested in the construction of spouts for pouring ladles where they have been shown to perform better with regard to the lifetime of the components tested.

The experiments have also shown that during the preparation of the castable refractory, the dispersion of the ceramic fibers in the mixture constituting the castable refractory was much easier than the dispersion of the metal fibers.

The fibers according to the invention can be manufactured by the technique commonly used to produce sintered bauxite for abrasives, as described in the patent U.S. Pat. No. 3,239,970 for Carborundum, that is to say by the crushing of natural bauxite, calcination, mixing in a binder to form a paste, extrusion of the paste, cutting of the fibers and sintering at a temperature of the order of 1400° C. The patent states that the section of the extruded products may be round, square, triangular or polygonal. A section which is particularly well suited for the implementation of the invention is a section that includes concave surfaces, for example in the form of a star, which improves the anchoring of the fiber in the refractory material. The diameter (or equivalent diameter) of the fibers is preferably between 0.2 and 1 mm.

In the case of the reinforcement of a castable refractory based on metal oxides, particularly alumina and silica, the constituents of the castable refractory are dry mixed in a mixer, the fibers are then incorporated into the mixture and then the water and the whole is stoved at a temperature of the order of 1500° C.

The castable refractories according to the invention can be used, in particular, for items of equipment used for the casting of liquid metals with a high melting point, for example silicon and silicon alloys.

EXAMPLES

Example 1

Test pieces of various shapes and dimensions were prepared using castable refractory with the following formulation:

| | |
|---|---|
| Brown corundum particles 2 to 5 mm | 23% |
| Brown corundum particles 0.2 to 2 mm | 37% |
| Brown corundum particles 0 to 0.2 mm | 24% |
| Amorphous silica particles 0 to 0.2 mm | 5% |
| Alumina particles 0 to 0.2 mm | 6% |
| Calcium aluminate with 80% $Al_2O_3$ | 5% |

With an addition of 0.2% sodium metaphosphate ($Na_2O$, $P_2O_5$), 0.26% ammonium polymethacrylate and 5.2% water.

The test pieces were dried in the oven for 24 hours at 110° C. and then subjected to a heat treatment that consisted of heating then up to 1500° C. at the rate of 2° C. per minute and then holding them at 1500° C. for 1 hour.

The following measurements were made on these test pieces

The cold compressive strength of cylindrical test pieces $\emptyset$=28 mm, h=90 mm, in accordance with Standard ISO/DIS 10059

The hot compressive strength of cylindrical test pieces Ø=23 mm, h=23 mm, in accordance with Standard MO CI 306.

The cold bending strength of cylindrical test pieces Ø=28 mm, h=50 mm, in accordance with Standard ISO 5014.

The hot bending strength of bars 150×25×25 mm in accordance with Standard ISO 5013.

The resistance to wear of cylindrical test pieces Ø=28 mm, h=50 mm, by pressing, with a force of 150 N, one of their circular faces against a disc with diamonds with a grain size of 120 μm, the tangential speed of the disc at the test piece being 1 m/s. The duration of the test is 10 minutes and the result is expressed as $cm^3$ of material removed.

The results obtained with the castable refractory formulation given above were as follows:

Cold compressive strength: 97.1 MPa
   Compressive strength at 600° C.: not measured
   Compressive strength at 1200° C.: not measured
Cold bending strength: 29.7 MPa
   Bending strength at 600° C.: not measured
   Bending strength at 1200° C.: not measured
Resistance to wear: 0.65 $cm^3$.

Example 2

Test pieces made of castable refractory were prepared with various shapes and dimensions in accordance with the formulation of Example 1 to which 4% (by weight) of metal fibers were added, these fibers being hemicylindrical, 1.5 mm diameter stainless steel wires having lengths between 25 and 30 mm.

The same measurements were made under the same conditions and the results obtained with this formulation were as follows:

Cold compressive strength: 81.4 MPa
   Compressive strength at 600° C.: 173 MPa
   Compressive strength at 1200° C.: 61.1 MPa
Cold bending strength: 27.9 MPa
   Bending strength at 600° C.: 22.3 MPa
   Bending strength at 1200° C.: 18.9 MPa
Resistance to wear: 0.48 $cm^3$.

Example 3

A reference batch of sintered bauxite fibers having a density of 3.85, a cylindrical shape of diameter 0.50 mm with a length between 5 mm and 12 mm and having a mass per unit length of 0.76 mg/mm, was manufactured by crushing and calcining natural bauxite, mixing it with a binder, extruding it and sintering it at 1400° C.

Test pieces made of castable refractory were then prepared with various shapes and dimensions in accordance with the formulation of Example 1 to which were added 2% (by weight) of the fibers prepared according to the method above.

The same measurements were made under the same conditions; the results obtained with this formulation being as follows:

Cold compressive strength: 64.8 MPa
   Compressive strength at 600° C.: 181 MPa
   Compressive strength at 200° C.: 86.2 MPa
Cold bending strength: 27.1 MPa
   Bending strength at 600° C.: 27.0 MPa
   Bending strength at 1200° C.: 24.5 MPa
Resistance to wear: 1.52 $cm^3$.

It may be observed that the addition of fibers made of sintered bauxite at half the percentage by mass, leads to a compression strength and a hot bending strength that is significantly greater and that this increase is greater the higher the temperature.

Example 4

Test pieces made of castable refractory were prepared with various shapes and dimensions in accordance with the formulation of Example 1 to which were added 15% (by weight) of the fibers prepared according to the method described in Example 3.

The same measurements were made under the same conditions; the results obtained with this formulation being as follows:

Cold compressive strength: 154 MPa
   Compressive strength at 600° C.: 185 MPa
   Compressive strength at 1200° C.: 69.3 MPa
Cold bending strength: 43.2 MPa
   Bending strength at 600° C.: 30.9 MPa
   Bending strength at 1200° C.: 23.3 MPa
Resistance to wear: 0.63 $cm^3$.

The incorporation of a percentage of fibers that is significantly higher, greatly improves the cold mechanical bending strength and the cold compressive strength, but not at high temperature.

Example 5

Four pouring ladles were made with identical dimensions; the spouts were manufactured following the compositions given in the four preceding examples. These ladles were used to cast metallurgical silicon. After pouring, the spouts were unclogged under the same conditions by means of steel bars cut with a bevel edge and forced between the deposits and the refractory lining until the deposits were detached.

The ladles were returned to the preparation shop in order to repair the spouts when wear of the spout had begun to cause wear of the ladle's metal frame.

After the ladles had been round three times, the results for the mean durability of the spouts were as follows, expressed as tonnes of cast silicon;

| | |
|---|---:|
| Reference lining from Example 1; | 1000 t |
| Lining reinforced with 4% stainless steel fibers | 700 t |
| Lining reinforced with 2% sintered bauxite fibers | 1500 t |
| Lining reinforced with 15% sintered bauxite fibers | 2000 t |

It will be observed that, in this application, reinforcement with metal fibers is not effective, while the lifetime of the ladle is improved with the fibers of the invention even at a lower percentage rate of reinforcement.

What is claimed is:

1. A castable, metal oxide based refractory material, comprising, as a reinforcement, 0.1 to 50% by weight of fibers produced by crushing and calcining natural bauxite, forming a paste with the crushed, calcined bauxite by mixing with a binder, extruding and sintering the paste and cutting the sintered paste to form fibers, the fibers having a length/diameter ratio greater than 10, and an equivalent diameter between 0.2 and 1 mm.

2. Refractory material according to claim 1, wherein said fibers have a cross section of cylindrical or prismatic shape, truncated by two surfaces.

3. Refractory material according to claim 2, wherein said surfaces are substantially planar and perpendicular to the axis of the cylinder or prism.

4. Refractory material according to claim 2, wherein said fibers have a cross section in the shape of a star.

5. Refractory material according to claim 1, which comprises at least one metal oxide selected from the group consisting of silica and alumina.

6. Refractory material according to claim 1, wherein said fibers have been produced by crushing natural bauxite, calcining the crushed bauxite, forming a paste with the calcined crushed bauxite by mixing with a binder, extruding the paste, cutting the extruded paste and sintering the cut, extruded paste to form the fibers.

7. Fibers for reinforcing refractory materials comprising sintered bauxite with a star-shaped cross section and a length/diameter ratio greater than 10, and an equivalent diameter between 0.2 and 1 mm.

8. Fibers according to claim 7, which have been produced by crushing natural bauxite, calcining the crushed bauxite, forming a paste with the calcined crushed bauxite by mixing with a binder, extruding the paste, cutting the extruded paste and sintering the cut, extruded paste to form the fibers.

9. Fibers for reinforcing refractory materials comprising sintered bauxite with a length/diameter ratio greater than 10, and an equivalent diameter between 0.2 and 1 mm, which have been produced by crushing natural bauxite, calcining the crushed bauxite, forming a paste with the calcined crushed bauxite by mixing with a binder, extruding the paste, cutting the extruded paste and sintering the cut, extruded paste to form the fibers.

10. Refractory material according to claim 9, wherein said fibers have a cross section of cylindrical or prismatic shape, truncated by two surfaces.

11. Refractory material according to claim 10, wherein said surfaces are substantially planar and perpendicular to the axis of the cylinder or prism.

* * * * *